Nov. 1, 1938.  G. A. TINNERMAN  2,135,417
ADAPTING SHEET METAL FOR RECEIVING BOLTS, SCREWS, OR THE LIKE
Filed Oct. 4, 1937

INVENTOR.
GEORGE A. TINNERMAN
BY Bates, Goldrick & Teare
ATTORNEYS

Patented Nov. 1, 1938

2,135,417

UNITED STATES PATENT OFFICE 2,135,417

ADAPTING SHEET METAL FOR RECEIVING BOLTS, SCREWS, OR THE LIKE

George A. Tinnerman, Rocky River, Ohio, assignor to Albert H. Tinnerman, Cleveland, Ohio Application October 4, 1937, Serial No. 167,308

4 Claims. (Cl. 29—148)

This invention relates to threadless fasteners and particularly to those which are utilized in conjunction with a threaded member for holding two or more articles together. Fasteners of this type may comprise a one-piece sheet metal strip, the thickness of which is less than the pitch distance of the bolt thread, as a result of which the thread engaging part of the fastener can extend readily into the thread and make an effective engagement therewith without requiring any part of the fastener to be attached to a multiple threaded nut. In making fasteners of this type, some difficulty has been experienced, particularly where spaced tongues are used for the thread engaging portion, in adequately centering the aperture so that the bolt may be entered or turned without being tilted with reference to the fastener. This difficulty attains considerable importance particularly where the fasteners are used in production on automotive assembly work.

I have found that the difficulty in maintaining accurate alignment between the bolt receiving aperture and the fastener and that of the bolt has been due to the fact that after the aperture has been pierced from the blank, it has been necessary to deform the tongues both in a vertical and transverse direction to make the margin surrounding the aperture in the shape of a helix that will conform to that of the thread with which the fastener is intended to be used.

An object of my invention, therefore, is to make a fastener, as well as a method, whereby the thread engaging portions of the fastener may be sufficiently deformed for proper engagement with a bolt thread and yet, which will assure accurate alignment of the bolt aperture with that of the cooperating bolt. In this way, an operator can start the bolt into the fastener in an expeditious manner without losing considerable time in manually manipulating the nut to effect an engagement with the thread. In this connection, my invention includes a fastener formation by means of which contact is made with the bolt thread on substantially the entire width of the thread engaging tongues; whereas in the absence of my invention engagement is apt to be had only on the corners of the tongue with the bolt thread.

Figure 1:
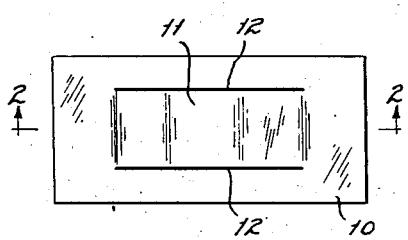
Figure 3:
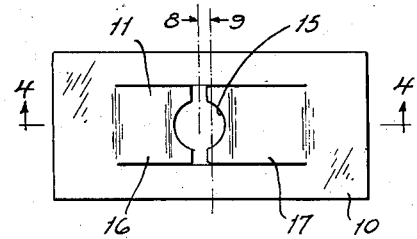
Figure 2:
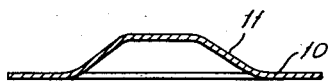
Figure 4:
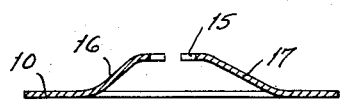
Figure 5:
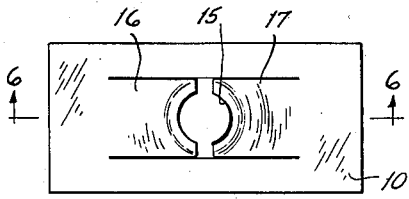
Figure 7:
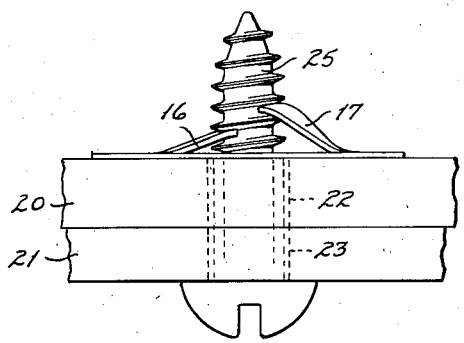
Figure 6:
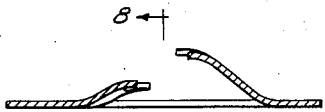
Figure 8:
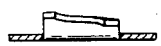

Referring now to the drawing, Fig. 1 is a top plan view of a blank upon which my invention may be made, the blank showing a portion deformed therefrom for making the thread engaging portion of the bolt receiving aperture; Fig. 2 is a sectional view taken on the line 2—2 in Fig. 1; Fig. 3 is a top plan view of the fastener at the completion of the piercing operation; Fig. 4 is a section taken on the line 4—4 in Fig. 3; Fig. 5 is a top plan view of the fastener at the completion of the tongue deforming operation; Fig. 6 is a section taken on the line 6—6 in Fig. 5, Fig. 7 is a side view of the fastener illustrating the use of it in connection with a threaded member, and with two parts that are to be joined together; and Fig. 8 is a section taken on line 8—8 in Fig. 6.

The fastener with which my invention is illustrated has a body portion 10 which may comprise a one piece sheet metal strip, the thickness of which is less than the pitch distance of the thread on the bolt with which the fastener is intended to be used. In the form shown, the body is substantially rectangular in form and has thread engaging portions which yieldably act upon a bolt thread to make a firm connection therewith. A fastener of this type is intended to take the place of a nut as well as a lock nut, and hence the yieldable characteristics of the thread engaging portion operate to maintain resistance against turning that would tend to loosen the tension between the bolt and the fastener.

One method of forming the thread engaging portion in the fastener is illustrated in the drawing as comprising the step of deforming the mid-portion, as indicated at 11 in Fig. 2 by slitting the body along parallel lines 12 and intermediate the ends thereof. The second step is to pierce the portion 11 preferably as is shown at 15 in Figs. 3 and 4 so as to provide a pair of tongues 16 and 17 which extend upwardly from the body at substantially the same angle of inclination. After the piercing operation, the tongues are then deformed;- the tongue 16 being depressed and the tongue 17 being raised, and then the ends of the tongues are twisted so as to make them conform readily to the shape of the bolt thread.

At the completion of the tongue shaping operation, the fastener is ready for use and is illustrated in final form in Figs. 5 and 6. In Fig. 7 it is shown in connection with two parts 20 and 21 which have bolt receiving apertures 22 and 23 respectively therein through which a threaded member 25 is extended.

To assure accurate alignment of the bolt receiving aperture 15 with the axis of the bolt, I pierce the opening in off center position with respect to the transverse median plane of the body, and this is perhaps best illustrated in Fig. 3 by the line 8—8 which represents the axis of the aperture that is pierced, while the line 9—9 represents the median plane of the fastener body.

This off-center position of the aperture compensates for the movement of the arms during the subsequent deforming step so that in the finished article, the axis of the aperture is substantially on the median line while the resultant opening is in proper shape and position for admitting a threaded member.

An important advantage of the present invention is the fact that I have minimized the necessity for manually manipulating the fastener to admit a threaded member during the assembly operation, and that I have therefore materially lessened the time required to make the connection between the bolt and fastener. This saving amounts to an appreciable item in the course of a day's time on production work, and is a vital factor in the successful operation of the device.

I claim:—

1. The method of adapting sheet metal for receiving a threaded fastener which comprises, slitting and bending an area of the sheet to provide a protuberance comprising a continuous wall, piercing said wall off center to provide a fastener receiving aperture having its axis offset from the median plane of said wall and thereby forming thread engaging elements of unequal length capable of engaging the threaded fastener at different elevations in accordance with the inclination of the threads thereof, and shaping said thread engaging elements such that their extremities lie on a helix corresponding substantially with that of the threads of the fastener for uniform threaded engagement therewith.

2. The method of adapting sheet metal for receiving a threaded fastener which comprises, slitting and bending an area of the sheet to form a protuberance comprising a continuous wall having a substantially uniform transverse section on either side of the median plane thereof, piercing said continuous wall off center to provide a fastener receiving aperture having its axis offset from the aforesaid median plane and thereby forming thread engaging elements of unequal length capable of engaging the threaded fastener at different elevations in accordance with the inclination of the threads thereof, and bending the thread engaging elements to dispose the extremities thereof on a helix corresponding substantially with that of the threads of the fastener to provide for uniform threaded engagement therewith.

3. The method of adapting sheet metal for receiving a threaded fastener which comprises, slitting and bending an area of the sheet to form a protuberance comprising a continuous wall having a substantially uniform transverse section on either side of the median plane thereof, piercing said continuous wall off center to provide a fastener receiving aperture having its axis offset from the aforesaid median plane and thereby forming thread engaging elements of unequal length capable of engaging the threaded fastener at different elevations in accordance with the inclination of the threads thereof, and shaping the thread engaging elements such that their extremities lie on a helix corresponding substantially with that of the threads of the fastener to provide for uniform threaded engagement therewith and to shift the axis of said fastener receiving aperture into substantially the aforesaid median plane.

4. The method of adapting sheet metal for receiving a threaded fastener which comprises, slitting and bending an area of the sheet to form a protuberance comprising a continuous wall having a substantially uniform transverse section on either side of the median plane thereof, piercing said continuous wall off center to provide a fastener receiving aperture having its axis offset from the aforesaid median plane and thereby forming thread engaging elements comprising a pair of tongues of unequal length adapted to cooperate in engaging the threaded fastener at different elevations in accordance with the inclination of the threads thereof, and bending the tongues to dispose the extremities thereof on a helix corresponding substantially with that of the threads of the fastener to provide for uniform threaded engagement therewith and to shift the axis of said fastener receiving aperture into substantially the aforesaid median plane.

GEORGE A. TINNERMAN.